United States Patent

[11] 3,586,895

| [72] | Inventors | Hal L. Sowers<br>San Carlos;<br>John T. Balkwill, San Jose, both of, Calif. |
|---|---|---|
| [21] | Appl. No. | 727,525 |
| [22] | Filed | May 8, 1968 |
| [45] | Patented | June 22, 1971 |
| [73] | Assignee | Optics Technology, Inc.<br>Palo Alto, Calif. |

[54] PHOTOCATHODE OF LIGHT FIBERS HAVING ENDS TERMINATING IN TRUNCATED CORNER CUBES
1 Claim, 8 Drawing Figs.

| [52] | U.S. Cl. | 313/94,<br>250/227, 350/96, 313/96 |
|---|---|---|
| [51] | Int. Cl. | H01j 39/02,<br>G02k 5/16, H01j 39/06 |
| [50] | Field of Search | 313/94, 96 |

[56] References Cited
UNITED STATES PATENTS

| 3,043,976 | 7/1962 | Kossel | 313/94 |
| 3,088,037 | 4/1963 | Baum | 250/227 |
| 3,267,283 | 8/1966 | Kapany | 250/71 |
| 3,335,310 | 8/1967 | Ney | 313/65 X |

Primary Examiner—Robert Segal
Attorney—Townsend and Townsend

ABSTRACT: A multiple total reflection optical device is disclosed with angled ends on optical wave guides in a bundle of optical wave guides. In one embodiment a photocathode imaging system is disclosed wherein the terminal fused plate of a fiber optic bundle is selectively etched to produce a taper at the end of each fiber which is then coated with a photocathode material. Light conducted through the fibers undergoes multiple total reflections down the terminal taper and is dissipated with high efficiency in the photocathode material. The tapered ends can be cones, corner cubes or other shapes.

PATENTED JUN22 1971
3,586,895
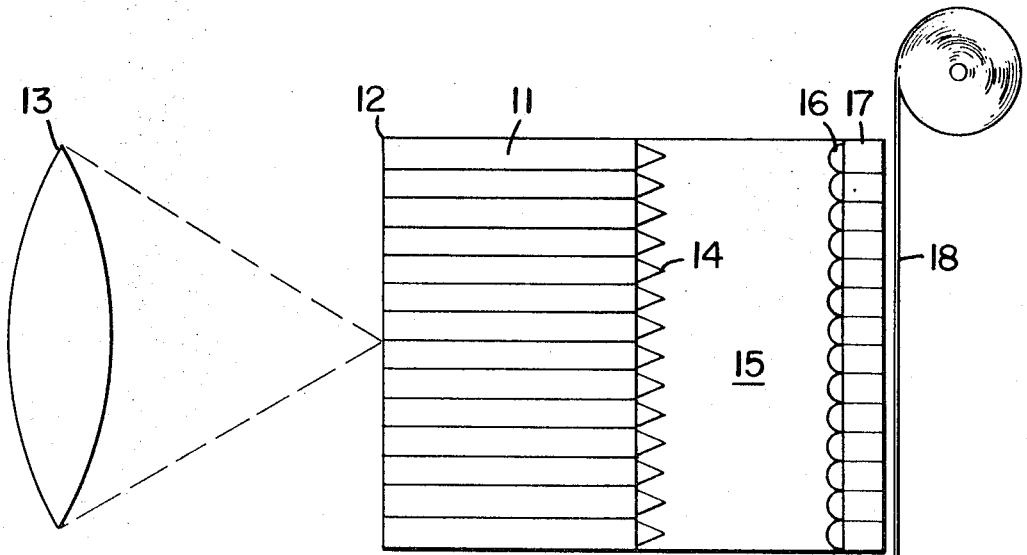
FIG_1
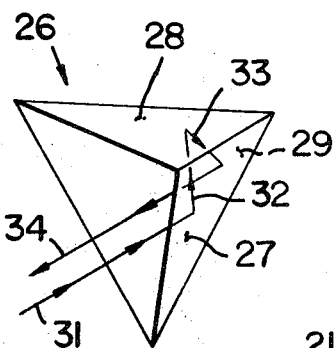
FIG_4
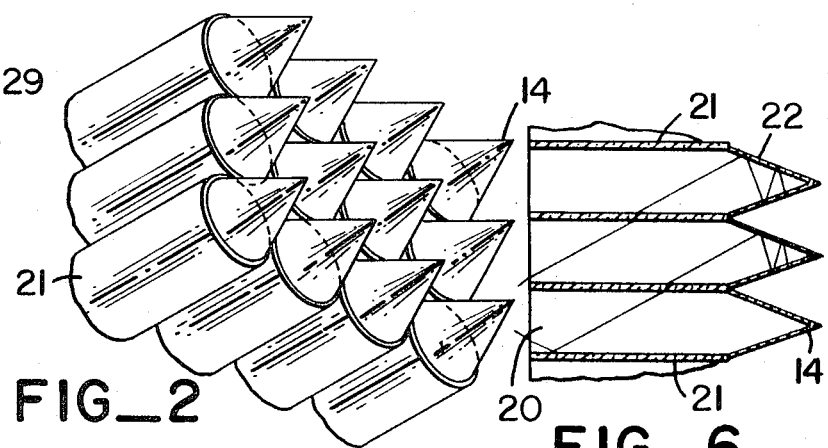
FIG_2　　FIG_6
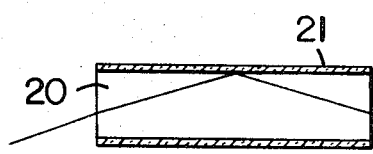
FIG_3a
FIG_3b
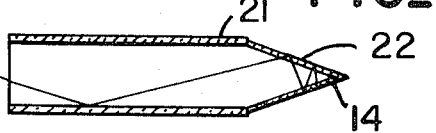
FIG_3c
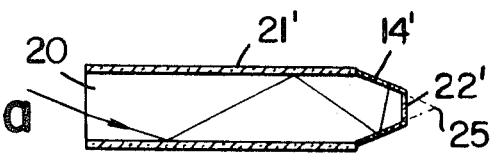
FIG_5
*INVENTORS*
HAL L. SOWERS
BY JOHN T. BALKWILL
*Townsend and Townsend*
ATTORNEYS

PHOTOCATHODE OF LIGHT FIBERS HAVING ENDS TERMINATING IN TRUNCATED CORNER CUBES

This invention relates to a new and improved optic apparatus and method of making same and particularly to a photoemissive device formed of a plurality of optical wave guides.

Photocathode image intensifiers have been made within a formed image is projected on a photocathode material to generate an electron beam whose cross-sectional energy distribution corresponds to the formed image. Such devices are insensitive, however, because of the inefficient use of the photon light energy incident on the photocathode material. Thus, most of the incident photons are diffused, reflected, or transmitted without interacting with the photocathode material to generate electrons. More efficient use of the incident photons has been accomplished by multiple total internal reflection of the photons through the photocathode material but such efficiency is typically obtained at the expense of imaging capability.

It is an object of the present invention to provide a new and improved photosensitive system and method of making same to make highly efficient use of incident photon energy through multiple internal reflection of incident photons through a photosensitive material.

Another object of the present invention is to provide an efficient photocathode utilizing multiple reflections of incident photon energy.

Still another object of the invention is to provide a new and improved fiber optics image intensifier which intensifies an image formed on the terminal fused plate of a fiber optics bundle.

A further object of the invention is to provide a fiber optics bundle in which each of the fibers terminates in a tapered end coated with a photocathode material to provide image intensification of the image fragments conducted along the fibers of the bundle.

Still a further object of the present invention is to provide a photosensitive surface formed of corner cubes to produce an efficient photocathode with high contrast.

In accordance with certain aspects of the present invention, a fiber optics bundle is provided in which each of the fibers comprises a central core of one optical material and an outer layer of another optical material selectively more sensitive to an etchant than the fiber core material. One end of the fiber bundle is formed into a surface such as fused into a plate for receiving light such as in the form of an image from a lens system. The fused fibers at the opposite end of the bundle are placed in an etchant for selectively etching the ends of the fibers to produce a terminal taper on each fiber. The terminal tapers of the fibers are then coated with a photocathode material.

The invention also contemplates formation of an image intensifier housing the end of the fiber bundle including the terminal cones in an evacuated chamber spaced from a planar phosphor anode maintained at a positive potential with respect to the photocathode material. Light energy from image fragments transmitted along the fibers of the fiber bundle undergoes multiple total internal reflection down the terminal tapers through the photocathode material to be substantially dissipated in the photocathode material. The generated electrons are accelerated toward the anode and strike the phosphor plane so that the incident energy is reconverted into photons. The generated photons representing the intensified image can be applied directly to a screen or film planes or gathered by a fiber optics fused plate immediately adjacent the phosphor anode and transmitted to a film plane.

The taper of the terminal cones of the fibers in the fiber optics bundle is chosen to produce multiple total internal reflection of light energy transmitted through the bundles so that substantially all of the incident photon energy is dissipated in the photocathode material thereby generating a maximum number of electrons.

In accordance with one aspect of the present invention, optical fibers are drawn to a circular cross section so that upon selective removal of portions of the fibers and cladding material the terminal ends of the fibers are in the form of cones. With this construction, a high number of reflections can be achieved in the terminal ends for high energy exchange from optical energy to electrical energy.

In accordance with still another aspect of the present invention, the optical fibers formed in accordance with the last aforementioned aspect or other terminal end configurations can be truncated to thereby provide truncated terminal ends. With this construction, field emission from a photocathode material on the terminal ends can be minimized.

In accordance with still another aspect of the present invention, the terminal ends of the optical fibers are provided with corner cube surfaces. Light entering the corner cube on the end of each fiber will be multiply reflected and all unabsorbed energy retransmitted back down the fiber. In accordance with this aspect of the present invention, an optical device can be provided in which not only high efficiency is achieved in conversion of optical energy to electrical energy, but also high contrast produced since little light energy will be transmitted through the photocathode.

In accordance with still another aspect of the present invention, the clad optical fibers are formed with a substantially triangular cross section and the fiber and cladding at at least one terminal end selectively removed with the cladding removed at a higher rate to leave a corner cube surface. While the corner cube surface can be provided on the terminal end of a fiber of this aspect of the invention provide an efficient, relatively easily manufacturable optical device.

Other objects, features and advantages of the present invention will become apparent in the following specification and accompanying drawing.

In the drawing:

FIG. 1 is a diagrammatic side view of a photocathode imaging system embodying the present invention with the relative size of the optical fibers greatly exaggerated for illustration of the present invention;

FIG. 2 is a fragmentary perspective view of the end of the fiber bundle showing the terminal tapered cones;

FIG. 3a shows a regular optical fiber comprised of a core material and an outer cladding layer in section;

FIG. 3b shows an optical fiber after differential etching according to the present invention;

FIG. 3c shows a selectively etched optical fiber according to the present invention showing in section the photocathode coating on the terminal taper cone;

FIG. 4 is a perspective view of an optical fiber having a corner cube on the terminal end;

FIG. 5 is a view similar to FIG. 3c with the fiber terminal end truncated; and

FIG. 6 is a view similar to FIG. 5 showing several fibers wherein the refractive index of the core and cladding material is the same.

As set forth above, the present invention is directed to an optical device incorporating a plurality of optical wave guides having tapered terminal ends and photosensitive material located at the terminal ends. As will be appreciated, the optical wave guides can take various different forms and the photosensitive material can also take different forms such as photoemissive or photoconductive material. For purposes of illustration, the invention will be described below and with reference to the drawing as applied to an image intensifier.

In the embodiment of the present invention illustrated in FIG. 1 there is generally provided a fiber optics bundle 11 terminating at the input end in a fused plate 12 positioned in the imaging plane of a lens system 13. The plate 12 can include provision for distortion correction and field flattening of the optical system and the output face can be of any configuration such as convex or concave instead of the planar configuration illustrated. The fibers at the opposite end of the fiber bundle from the input end are also fused together and the terminal end of each fiber is provided with a taper such as by differential etching as hereinafter described. The terminal tape of each fiber is coated with a photoemissive material to form a photocathode 14 such as an S-20 type made of a trialkali material. Spaced from the photocathode 14 within a vacuum envelope 15 is a photoanode 16 such as phosphor maintained at a positive voltage with respect to the photocathode. A display means is provided for the anode and in the embodiment illustrated includes a fused fiber optics plate 17 adapted to collect photons generated by the photoanode 16 and transmit them to a film plane 18. An image intensifier can include a number of cascaded photocathodes and photoanodes of the type illustrated.

Referring now to FIG. 2, there is shown a perspective view of the output ends of a number of the optical fibers. As illustrated in FIG. 3a, each fiber includes a core material 20 and a cladding layer 21 covering the side surface of the fiber between the input and output ends. For an efficient optical system, the index of refraction of the cladding material 21 is typically less than the index of refraction of the optical core material 20 so that light entering each fiber will be propagated down the fiber by reflections at the core-cladding interface. However, as pointed out with reference to FIG. 6, different relations between indices can be utilized.

According to one aspect of the present invention, the material for the cladding layer 21 is chosen to be selectively removable at a higher rate than the core material. Where the fiber terminal taper is produced with this invention by an etchant, the cladding material is selected to be removable at a higher rate when a given etchant than the core material. Thus, upon exposure of the end of the optical fiber to the etchant, the outer layer 21 is etched at selectively greater rate producing a terminal taper at the etched end of the fiber.

Thus, as shown in FIG. 3b, the outer layer 21 has been etched back leaving the central core material 20 exposed to the etchant for increasingly greater length of time in the direction of the tapered end of the fiber resulting in a terminal taper in the shape of a cone 22. Other methods within the purview of the present invention can be utilized to remove the cladding material 21 at a higher rate than the core material 20. Such methods including sputtering or bombardment with particles and selective removal along preferred axes of certain crystals. Individual fibers can be drawn to a taper by pulling or gravity forces under applied heat. Where the size of the fiber permits, the terminal taper can be formed by grinding.

As illustrated in FIG. 3c, the terminal taper 22 is coated with a photocathode material 14 such as a trialkali material. Light from an image fragment transmits along the fiber by multiple reflection and undergoes further multiple total internal reflection down the terminal taper 22. The conical angle of acceptance for the fiber which is dependent upon the refractive indices of the media of the system and the taper of the cone 22 adjustable by the etchant strength and application time are chosen so that multiple total internal reflection continues along the taper 22 until the incident light energy is substantially dissipated through multiple encounters with the photocathode material.

Electrons generated by the photocathode material by dissipation of the incident light energy therein are accelerated toward the anode 16. Upon striking the anode, the amplified energy is converted back to photons which are collected by the fiber optics fused plate 17 and transmitted as for recording on a photographic film 18. Additionally, since maximum light energy is absorbed, a minimum amount of light energy can pass through the photocathode to regions where retroreflections would occur for production of emission that would destroy the image contrast. Thus, an intensified image is produced making highly efficient use of the incident light energy from the formed image thereby preserving the information and contrast of the initially formed image.

The core material 20 is chosen to have an index of refraction similar to that of the photocathode material 14 so that light incident on the photocathode layer enters the photocathode material without substantial reflection at the core-photocathode interface. An antireflective layer can be provided between the core material and cathode material to make a better impedance match. The light passing through the photocathode layer 14 is substantially internally reflected at the cathode-vacuum interface. The chamber formed by envelope 15 can be evacuated or contain a medium with lower index of refraction than the photocathode material.

It is apparent that different shaped terminal tapers can be produced by using optical fibers drawn with different cross-sectional areas or with ends of different cross-sectional areas. Thus, instead of a fiber with a circular cross section at the terminal end for forming a terminal cone by etching, corner cube or pyramidal terminal tapers can be produced with fibers having end cross sections triangular or square, respectively. Similarly, hexagonal cross sections are possible.

In the case of a corner cube, often referred to as a retroreflector, a high contrast photosensitive device can be produced. For the corner cube 26 illustrated in FIG. 4 and having surfaces 27, 28 and 29, an entering light ray 31 strikes surface 27, is reflected as a ray 32 to surface 28 and then as a ray 33 to surface 29 and exits out of the corner cube along a path 34 parallel to but in a direction opposite to ray 32. With this construction multiple reflections for high energy exchange from photons to electrons can be achieved but with the assurance that substantially all light not absorbed by the photocathode material will be redirected back to the input of the fiber and not pass on through the photocathode where it can reduce the contrast of the image formed in other elements of the optical system.

The corner cube terminal taper can be produced by any of the methods described above. Where the terminal end of the fiber has a triangular cross section, the corner cube terminal taper is ideally produced by removing the cladding material at a higher rate than the core material. A triangular cross section can be provided on only the terminal end of the fiber or the entire length of the fiber. However, the corner cube terminal taper is ideally produced by forming optical fibers that have a triangular cross section and then selective removal of material at the fiber terminal ends.

As illustrated in FIG. 5, the terminal taper 22' can be truncated as by polishing or grinding the fiber ends before applying the photocathode material 14'. By truncating the terminal taper 22' electron field emission from the ends of the fibers can be reduced, a particularly important advantage in a proximity focused image intensifier. In this truncated structure a sufficient gradual taper and a selected cone of acceptance at the fiber input end can be provided so that substantially all the light entering the terminal taper cone enters at an angle less than the "returning angle" as that term is defined and described in the article "Fiber Optics" by Kapany in Strong, *Concepts of Classical Optics*, W. H. Freeman and Co., 1958. Thus, where $R_1$ and $R_2$ are the radii of the entrance and terminal ends, respectively, of the truncated cone 22' illustrated in FIG. 4 having an imaginary apex 25, the taper and extent of truncation of the cone should be chosen so that substantially all light enters the cone at an angle with respect to the cone axis of less than $\alpha$ where $$\alpha = R_2/R_1$$

Light entering the cone at an angle with respect to the axis of the cone of less than $\alpha$ will undergo multiple total internal reflections at the photocathode-vacuum interfacing before reaching the truncated end of the cone. The extend of the taper will determine the number of reflections and may be chosen so that substantially all of the incident light energy is dissipated in the photocathode layer before the light beam reaches such an angle of incident with respect to the photocathode-vacuum interface so that it passes through into the vacuum. When the cone is not truncated, the extent of taper should still be chosen so that the light entering the cone from the optical fiber undergoes sufficient multiple total internal reflections before reaching an imaginary plane normal to the axis of the cone where any remaining light would exit into the vacuum without being internally reflected. In that case the light energy would be substantially dissipated before such imaginary plane were reached.

As illustrated in FIG. 6, under certain conditions the optical device can be produced utilizing a cladding material with an index of refraction substantially the same as that of the core material. As shown there, a certain portion of the light transmitted along an optical fiber can be transmitted through the cladding material into an adjacent fiber. However, when the light reaches the terminal end of a given fiber, multiple reflections will occur for efficient exchange conversion of light energy to electrical energy.

Although it is believed that the above description provides sufficient information to a person skilled in the art to practice the present invention, the following illustrative examples of the method and apparatus of the present invention are given by way of further explanation.

Photocathodes of the type illustrated in FIG. 1 were produced by forming vacuum tight fused plates of optical fibers by drawing under application of heat a bundle of cylindrical optical fibers each positioned within closely fitting hollow tubes of cladding material, severing lengths of such drawn bundles, assembling a number of such bundles together and redrawing the assembled bundles until the fibers were of desired cross section.

For one photocathode the core material was Corning 7056 glass and the cladding was Corning 7052 glass, each with an index of refraction of about 1.5. The cladding glass having a greater amount of halogens than the core material is more sensitive to a hydrofluoric acid etchant. When the fibers of the fused plate were 0.030 inches in diameter, a conical terminal taper was produced on each fiber by etching one face of the fused plate in a 50 per cent solution of hydrofluoric acid for 30 minutes. In the case of fused plates having fibers 20 microns in diameter, conical terminal tapers were produced with the same etchant in about 90 seconds.

For a fused plate in which the fiber core material had an index of refraction of about 1.8 and the cladding material an index of refraction of about 1.5, Optics Technology DBF 68 glass was used for the core material and Kimble glass R6 glass was used for the cladding material. In the example, the etchant was 70 per cent hydrofluoric acid, 10 per cent nitric acid and 20 per cent water. For fibers 0.030 inches in diameter, the etchant was used for 30 minutes and for 20 micron fibers, the etchant was used for 90 seconds.

An advantage of the present invention lies in the fact that an image intensifier of very high resolution can be produced. Thus, where the thickness of the fiber optics fused plate 11 as shown in FIG. 1 is small, the image formed by the optical system 13 can be focused in the plane containing the bases of the terminal tapers 22.

While the invention has been described for purposes of illustration as applied to a photoemissive image intensifier, it also applies to other devices as well. For example, a photoconductive material such as cadmium sulfide is provided on the terminal tapers of the optical wave guides in a bundle of optical wave guides.

While one embodiment of this invention has been shown and described, it will be apparent that other adaptations and modifications of this device can be made without departing from the true spirit and scope of the invention.

We claim:

1. A photocathode imaging system comprising: a fiber optic fused plate having a plurality of coated optical fibers fused together to form at one end a plate surface adapted to receive an image to be intensified, each of said fibers terminating at the other end in a terminating surface positioned at an angle to the axis of said fibers and formed to provide multiple reflections of light received from said image surface: each angled terminating surface being a corner cube truncated to provide a culminating face perpendicular to the axis of said fibers, and each said terminating surface being coated with a photocathode material; an anode spaced from said photocathode coated plate surface; and a vacuum envelope enclosing said photocathode coated surface and said anode.